United States Patent
Munoz et al.

(12) 
(10) Patent No.: US 6,741,585 B1
(45) Date of Patent: May 25, 2004

(54) INTERWORKING OF ADDRESSING IN AN INTERNETWORK

(75) Inventors: Robert J. Munoz, New Albany, OH (US); David Michael Rouse, Granville, OH (US); Malathi Veeraraghavan, Atlantic Highlands, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/565,528

(22) Filed: May 5, 2000

(51) Int. Cl.[7] .......................... H04L 12/66; H04L 12/28
(52) U.S. Cl. ............... 370/352; 370/395.1; 370/395.52; 370/401
(58) Field of Search ................................ 370/230, 236, 370/352–357, 389, 392, 395.1, 395.6, 395.54, 395.52, 400, 401; 709/218; 340/825.52; 379/88.17, 220.01, 222.11, 221.12, 229

(56) References Cited

U.S. PATENT DOCUMENTS 6,243,383 B1 * 6/2001 Li et al. ..................... 370/395
6,493,345 B1 * 12/2002 Margulis et al. ......... 370/395.53
6,501,755 B1 * 12/2002 McAllister et al. .......... 370/392
6,535,507 B1 * 3/2003 Li et al. ..................... 370/356

* cited by examiner

Primary Examiner—Duc Ho (57) ABSTRACT

An address interworking system and method for an internetwork that includes a first network using first network addressing communicating via one or more internetworking gateways with a second network using second network addressing. The gateways register one or more first network addresses in the second network as first network address-encapsulated or- mapped second network addresses. Reachability information regarding the first network-encapsulated or -mapped second network addresses is then disseminated through the second network. When a communication request containing a first network destination address is received from the first network at one of the gateways, the receiving gateway performs encapsulation or mapping of the first network destination address into a first network-encapsulated or -mapped second network destination address. It then routes a communication request containing the first network-encapsulated or -mapped second network destination address through the second network based on said disseminated reachability information.

37 Claims, 6 Drawing Sheets

FIG. 13

INTERWORKING OF ADDRESSING IN AN INTERNETWORK

CROSS-REFERENCE TO RELATED APPLICATIONS

Not Applicable

STATEMENT REGARDING FEDERALLY SPONSORED

Not Applicable

BACKGROUND OF THE INVENTION

1. Field of the Invention

The field of the present invention is networks and internetworks. More particularly, the invention relates to address interworking between networks in an internetwork.

2. Description of the Prior Art

By way of background, the proliferation of different networking technologies has created an increasing need for internetworking. Schemes for internetworking are required to connect endpoints on different networks, or to use a different network for part of the path between two endpoints that use the same networking technology. For example, a telephone user may want to be connected to an Internet telephone user, or a call between two telephones may be routed via a packet-switched network, such as an IP or ATM network. Internetworking is handled by gateways (GWs) that connect to both of the networks being interconnected. There are many aspects to the internetworking problem. Primarily these consist of interworking the (a) user-plane protocols, (b) routing protocols, (c) signaling protocols, and (d) addressing schemes. It is with the problem of address interworking that the present invention is concerned.

Simply stated, the problem presented for solution is as follows: When a service request (packet or call) identifies a destination by its network address (say a network 1 address), how does a gateway to a second network, say network 2, through which this service is handled, determine the network 2 address of the egress gateway through which to reach the destination? As used herein, the term "call" signifies a request for a circuit in a circuit-switched network, or a virtual circuit in a packet-switched connection-oriented network with or without additional feature processing.

Generally speaking prior art address internetworking solutions fall broadly into four categories: (i) schemes that send address resolution messages when a call/packet arrives ("pull" information), (ii) schemes in which address resolution information is sent in routing protocols ("push" information), (iii) schemes that use administered address translation tables at gateways, and (iv) schemes that use encapsulated/mapped addresses with routing protocols spreading reachability information.

Internetworks that are of interest currently include PSTN (Public Switched Telephone Network)-ATM, IP-ATM, and PSTN-IP internetworks. Example scenarios include (i) A telephone-to-telephone call routed through an ATM network, (ii) An IP-endpoint-to-IP-endpoint flow routed through an intermediate ATM network, and (iii) A telephone-to-telephone call routed through an IP network. The PSTN uses 8-byte E.164 addresses, IP networks use 4-byte IPv4 addresses, and ATM networks use 20-byte ATM End System Addresses (AESAs).

Solutions proposed for the address interworking problem in these three internetwork combinations fall into the first three categories of address interworking solutions listed above. It is believed, however, that the fourth category of address interworking solution, which has been limited to IP-ether-net internetworking, may be used as a starting point for a comprehensive address interworking solution for use in PSTN-ATM, IP-ATM and PSTN-IP internetworking environments.

SUMMARY OF THE INVENTION

The foregoing problems are solved and an advance in the art is provided by a system that uses encapsulated/mapped addresses with routing protocol dissemination of reachability information in an internetwork that includes a first network using first network addressing communicating via one or more internetworking gateways with a second network using second network addressing. The gateways register one or more first network addresses in the second network as first network address-encapsulated or- mapped second network addresses. Reachability information regarding the first network address-encapsulated or -mapped second network addresses is then disseminated through the second network. When a communication request containing a first network destination address is received at one of the gateways, the receiving gateway performs encapsulation or mapping of the first network destination address into a first network-encapsulated or -mapped second network destination address. It then routes a communication request containing the first network-encapsulated or -mapped second network destination address through the second network based on the disseminated reachability information.

In preferred embodiments of the invention, plural ones of the first network address-encapsulated or -mapped second network addresses are reachable through a single one of said gateways. One or more of the first network address-encapsulated or -mapped second network addresses may also correspond to a range (summary) of first network addresses. Part of the first network address-encapsulated or -mapped second network addresses may contain high level protocol information that is propagated during the spreading of reachability information. High level protocol information may include terminal capabilities, feature information, or the like.

The first and second networks can be of various types. For example, the first network may be a PSTN and the second network may be an ATM network. In that case, the E.164 numbers used as addresses in the PSTN can be encapsulated in the AESAs used in the ATM network. The first network may also be an IP network with the second network being an ATM network. In that case, the IP addresses used in the IP network can be encapsulated in the AESAs used in the ATM network. The first network may likewise be a PSTN and the second network may be an IP network. In that case the E.164 numbers used as addresses in the PSTN may be mapped to the IP addresses used in the IP network.

DETAILED DESCRIPTION OF THE DRAWING

The foregoing and other features and advantages of the invention will be apparent from the following more particular description of preferred embodiments of the invention, as illustrated in the accompanying Drawing, in which.

DETAILED DESCRIPTION OF THE PREFERRED EMBODIMENT

In order to provide a better understanding of the invention, which is described in exemplary fashion below with reference to FIGS. 5–10, a review of the above-mentioned prior art address inter-working solutions proposed for PSTN-ATM, IP-ATM, and PSTN-IP internetworking will first be described with reference to FIGS. 1–4.

PSTN-ATM Address Interworking

Figure 1:
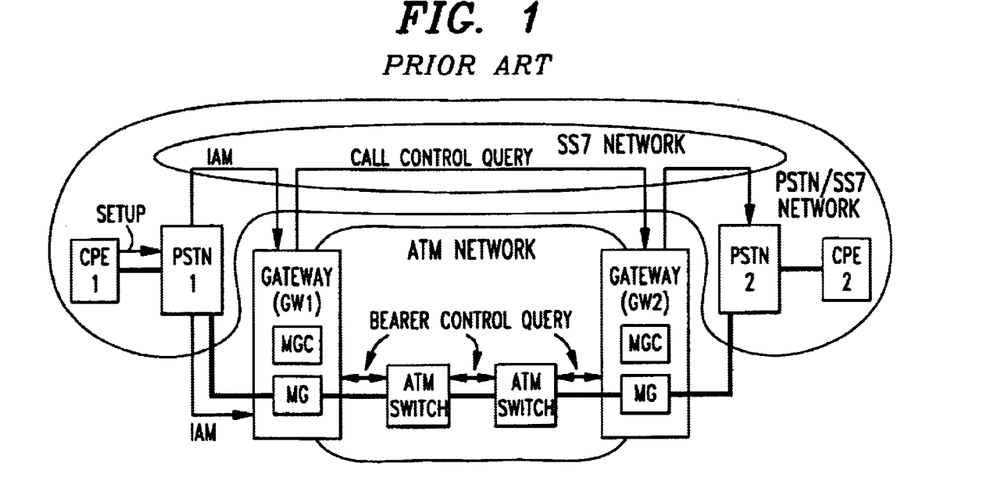
FIG. 1 is a functional block diagram showing the use of prior art address resolution in a PSTN-ATM internetwork.

FIG. 1 illustrates a prior art solution to the address interworking problem in a PSTN-ATM network. This solution is based on sending an address resolution message and receiving a response when a call arrives (a first category solution, "pull" address resolution information). Thus, when Customer Premises Equipment (CPE) 1 calls CPE 2, it sends the telephone address, called an E.164 number, of CPE 2 in a Setup message or in tone signaling. PSTN switches use SS7 (Signaling System No. 7) messages to set up the call. An IAM (Initial Address Message) is generated from a PSTN switch (PSTN 1) to the next hop node, which in the example of FIG. 1 happens to be a gateway (GW1). The IAM carries a destination (called party) E.164 number. If Local Number Portability (LNP) is used, then typically the called party address is the LNP resolved number (also referred to as an LRN), which identifies the physical location of the called endpoint. As used hereinafter, an E.164 address refers to the address that is determined by physical connectivity, in other words, the LRN. In some cases, LNP resolution is not performed on the ingress side, in which case, the address that is referred to as the E.164 address, on which routing is performed, is an unresolved number.

The ingress gateway GW1 needs to determine the ATM network address of the egress gateway (GW2) in the far-end telephone network. To determine this address, a "call control" query is issued. There are two variations in the use of this address resolution scheme. They are known as "backward connection setup" and "forward connection setup." In the backward connection setup scheme, the call control query sent through the SS7 network from the ingress GW1 to the egress GW2 carries the AESA (ATM End System Address) of the ingress GW1, allowing the egress GW2 to initiate backward connection setup. In the forward connection setup scheme, the IAM call control query is answered by the egress GW2 returning its AESA in the ACM (Address Complete Message) or ANM (ANswer Message), causing the ingress GW1 to then initiate forward setup through the ATM network.

Call control and bearer control separation has long been a goal of B-ISDN signaling. Call control includes several functions that pertain to coordinating services, feature interaction, look-ahead (to check if the called telephone is busy), and terminal capability determination. The latter is required to ensure that both gateways use the same higher layer protocols before setting up a connection between them. For example, if the ingress and egress gateways use different speech encoding schemes or different ATM adaptation layer (AAL) protocols, a format converter is needed and connections should be set up from the gateways to a converter. H.323 and SIP (Session Initiation Protocol) have been defined for call control signaling. Although these functions should be separate, it has been proposed that bearer control protocols should be self-sufficient, allowing for connections to be set up and released with no call control overhead if additional features are not needed and if terminal capabilities are known a priori. By including the functionality of address resolution in the call control query, call control signaling overhead, which adds to end-to-end connection setup delay is incurred for all calls, including those for which no feature invocation is needed and terminal capabilities are already known a priori.

IP-ATM Address Interworking

An IP/ATM address interworking scheme has been proposed as Classical IP over ATM using address resolution messages between hosts and ATM-ARP servers. Simply stated, ATM-ARP servers store AESAs corresponding to IP addresses and respond to queries. This is not a scalable solution and hence is only proposed for local area networks.

A second IP/ATM address interworking scheme proposed for wide-area networks is called NHRP (Next Hop Resolution Protocol). This scheme is adopted in the MPOA (MultiProtocol Over ATM) specification. NHRP will be described using the prior art network of FIG. 2. Scalability is achieved by distributing NHRP servers (called NHS), and in a typical implementation locating one NHS per IP router (R0–R5), allowing each NHS to store address translations for only its router's sub-net addresses. When an IP packet arrives at IP-ATM gateway 1 (comparable to the ingress GW1 of FIG. 1), it generates an NHRP query for the destination IP address (in the example, that of end host 2). This query is sent hop-by-hop through the network of IP routers by determining the next-hop IP router address from the routing data for the destination address being resolved. In the example, the route to reach end host 2 from IP-ATM gateway 1 is via R1, R2, R4, and R5, and hence NHRP queries are sent hop-by-hop along this path. When an NHRP query reaches router R5, it presumably has the AESA for IP-ATM gateway 2, which it returns directly to IP-ATM gateway 1 through the IP network. This allows IP-ATM gateway 1 to initiate ATM connection (bearer) setup to IP-ATM gateway 2.

Figure 2:
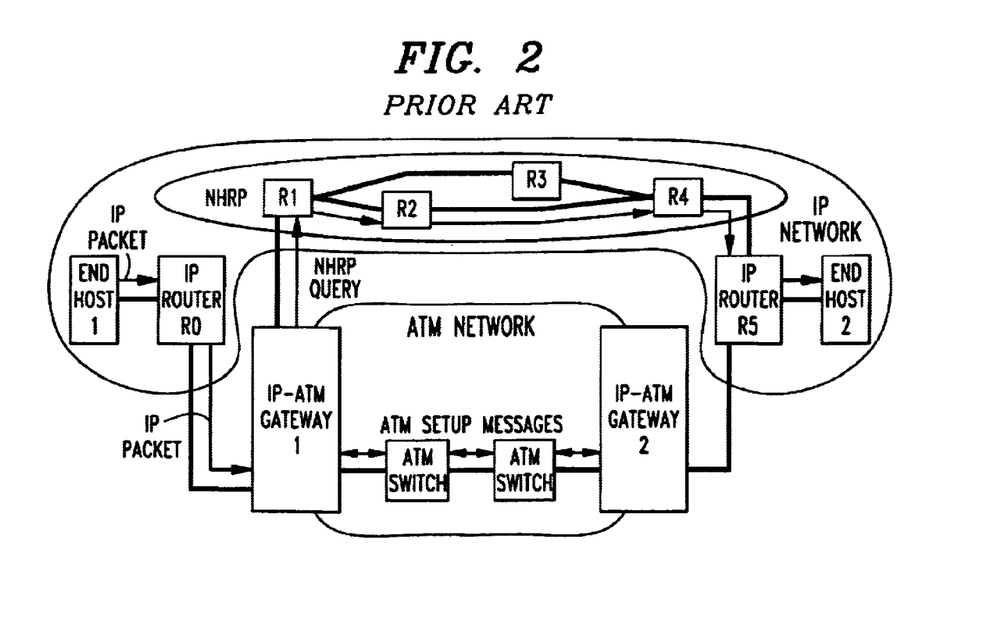
FIG. 2 is a functional block diagram showing the use of prior art address resolution in an IP-ATM internetwork.

Even though the call control query described earlier for FIG. 1 is comparable to NHRP as described relative to FIG. 2, the problem of the ingress server requiring the address of the egress server is handled differently. It is solved using a distributed scheme in NHRP. Instead of the ingress IP-AT gateway 1 sending an NHRP query directly to the egress IP-ATM gateway 2 that has the translation, queries are sent hop-by-hop, with the next hop determined by consulting IP routing data for the address being resolved. If each next hop router has an NHRP server to stop and process the NHRP query, it is easy to determine the next hop node to which to forward an NHRP query. This approach avoids the problem of an ingress gateway needing to know the IP address of an egress gateway/server that has the address resolution information corresponding to a destination IP address. This is in contrast to the PSTN-ATM interworking scheme, where ingress gateways needed the point code address of egress gateways/servers. However, the penalty paid is that either all routers need to be equipped with NHRP servers, which makes it possible to use IP routing data to determine the next-hop NHS, or each NHS needs to somehow determine the IP address of the next-hop NHS. Also, with some network topologies, it is possible for unstable routing loops to form as a result of failure-induced network topology changes. NHRP requests are also unreliable and subject to packet loss.

Both classical IP-over-ATM and NHRP are solutions that fall in the first prior art address inter-working solution category, i.e., to pull information when packets arrive. Another approach to address interworking has been proposed for IP/ATM address interworking based on the second prior art solution category, i.e., pushing address resolution information. This approach uses OSPF (Open Shortest Path) Address Resolution Advertisements (ARA). The OSPF ARA option uses the opaque LSA (Link State Advertisement) mechanism to distribute IP to ATM (or other) address resolution information between participating routers. Opaque LSAs provide a generalized mechanism to allow applications or routers to distribute information within the OSPF domain, which routers can propagate without interpretation. ARA-capable routers advertise ATM or other types of address reachability for themselves and their directly connected networks using ARA-specific opaque LSAs. Intermediate routers need not be ARA-capable as long as they support opaque LSAs. ARA advertisements are propagated just like other opaque LSAs by using standard OSPF LSA flooding mechanisms. ARA-capable routers process received ARAs and integrate the reachability information into their routing tables (which are extended compared to standard IP routing tables). A mechanism similar to opaque LSAs is available in the PNNI (Private Network-to-Network Interface) routing protocol using transitive tags. Using this mechanism, IP address to AESA resolution information could be passed between gateways using the PNNI routing protocol.

If routing protocols support multiple user-plane protocols, for example, integrated IS-IS supports both IP and OSI protocols, there would be no need for an opaque-LSA-like mechanism. However, because IP routing protocols only support IP addresses and the PNNI routing protocol only supports AESAs, the opaque-LSA feature of OSPF or the transitive-tag feature of the PNNI routing protocol are needed.

Advantages of the ARA approach over NHRP include: (i) auto-discovery of participating routers instead of discovery via explicit polling in NHRP, (ii) quick and robust propagation of changes to network topology and system reachability via OSPF's reliable flooding mechanism, and topology-induced packet loss and transient routing loops are limited to the OSPF convergence time (which is typically on the order of a few seconds once a failure has been detected by any router in the OSPF domain), (iii) support for both control-/topology-driven and flow-driven ATM (or other) connection setup, and (iv) reduced delay overhead prior to sending packets.

PSTN-IP Address Interworking

Work on PSTN-IP address interworking has been done in the IPTEL working group of the IETF. IPTEL's TRIP (Telephone Routing over IP) proposal is to have location servers connected to gateways within Internet Telephony Administrative Domains, which contain address translations from E.164 addresses to IP addresses of gateways. LDAP (Lightweight Directory Access Protocol) is a candidate protocol for intra-domain use between gateways and location servers.

The TRIP proposal describes a BGP (Border Gateway Protocol)-like inter-administrative domain protocol for advertising the reachability of telephony destinations between location servers (essentially address resolution information), and for advertising attributes of routes to those destinations. The IP TBGP (Telephony Border Gateway Protocol) is similar. GLP (Gateway Location Protocol) has also been defined for use between location servers of different domains.

The TRIP framework document does not select one mechanism for how gateways obtain address resolution information when calls arrive. They allow for the use of LDAP to access this data from the location server as well as for the option of using a TRIP-like routing protocol to download address resolution information from location servers to gateways so that the latter have the information needed when calls arrive. The scheme used between location servers in different domains can be classified into the second prior art solution category in that it is a "push" based approach. A difference is that instead of using an existing routing protocol, such as OSPF, to "push" address resolution information in opaque LSAS as is done in IP-ATM internetworking, a new routing-like protocol is defined that only runs at location servers (and not all routers). However, issues such as how location servers know the addresses of their "neighboring" location servers with whom they exchange address resolution information need to be addressed. The TRIP framework document states that this information is administered in the location servers based on service provider agreements. This issue does not arise in the OSPF ARA scheme because in that scheme the network routing protocol, which runs at each router, is used to spread address resolution information.

IP-Ethernet Address Interworking

The above-described examples fall in the first three categories of prior art address interworking solutions, i.e., pulling address resolution information when needed, pushing it using routing protocols, and administering data tables. An address interworking scheme will now be reviewed that falls into the last solution category, i.e., that of creating encapsulated/mapped addresses from the address format of one network into that of the second network. This approach is used in IP/ethernet internetworking.

Figure 3:
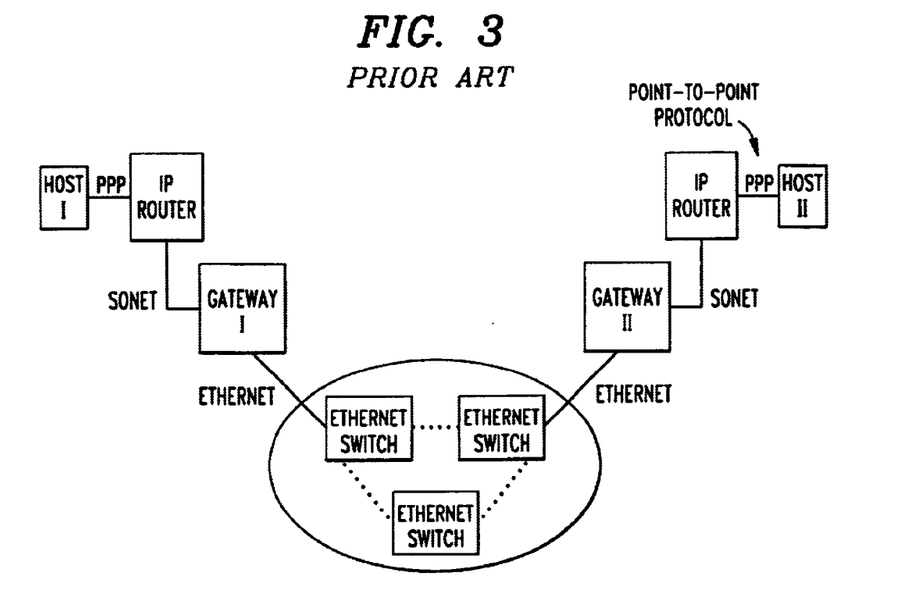
FIG. 3 is a functional block diagram showing the use of prior art address resolution in an IP-ethernet internetwork.

Two mechanisms are used for address resolution in IP-ethernet internetworks. The first mechanism, which is the more-commonly known of the two, uses address resolution messages (i.e., "pull" information). ARP (Address Resolution Protocol) is an example. As is well known, ARP is used to translate IP addresses to MAC (Media Access Control) addresses. By way of illustration, FIG. 3 shows two IP networks (with point-to-point links between IP routers and hosts) that are interconnected by a network of ethernet switches, which perform packet forwarding based on MAC addresses. The gateway nodes (Gateway I and Gateway II) are IP routers with ethernet interfaces. When an IP datagram sent by host I to host II is received at Gateway I, it determines the MAC address of Gateway II by using ARP (Address Resolution Protocol) for unresolved addresses (i.e., addresses for which the address resolution is not already cached). ARP requests are flooded from one ethernet switch to the next until Gateway II is reached and it responds with its MAC address. The MAC address is returned in an ARP response allowing Gateway I to send the IP datagram encapsulated in an ethernet frame to Gateway II.

Figure 4:
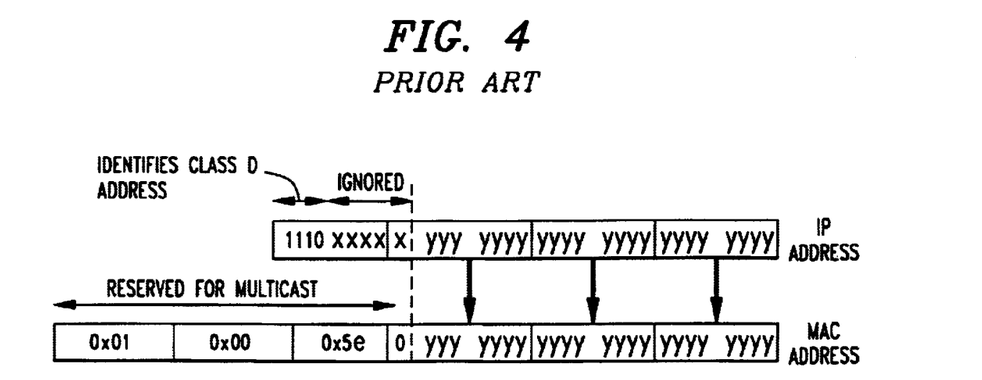
FIG. 4 is a diagrammatic illustration of the format of a prior art IP address-encapsulated MAC address, as used in the IP-ethernet internetwork of FIG. 3.

The second address interworking mechanism, which is an example of the fourth solution category, i.e., address encapsulation/mapping, is used for multicast IP addresses instead of address resolution queries. The ethernet MAC address is determined directly from a Class D multicast IP address, as shown in FIG. 4. IGMP (Internet Group Management Protocol) is used to allow a host to register itself for a multicast group identified by a specific Class D IP address. A gateway receiving an IP datagram that needs to be sent to a multicast group will simply determine the corresponding ethernet address using the encapsulation scheme shown in FIG. 4, and forward the datagram into the network of ethernet switches. The reason for using this scheme instead of ARP is that with the latter scheme, given that multiple hosts are in a multicast group, several hosts would respond with their MAC addresses. This implies that the ingress gateway would need to send out several MAC frames, one to each receiving host, in contrast to the encapsulated scheme, where only one MAC frame is sent.

By convention, MAC addresses with the first three bytes equal to 01:00:5e are not allowed for use in unicast ethernet addresses (which is a drawback of the address encapsulation/mapping scheme). The ethernet interfaces on the gateways have their own MAC addresses for unicast services distinct from the multicast group MAC address. The multicast MAC address is an address for which they are programmed to receive MAC frames when their hosts join an IP multicast group using IGMP or other mechanisms.

Proposed Solution For Address Interworking

Figure 5:
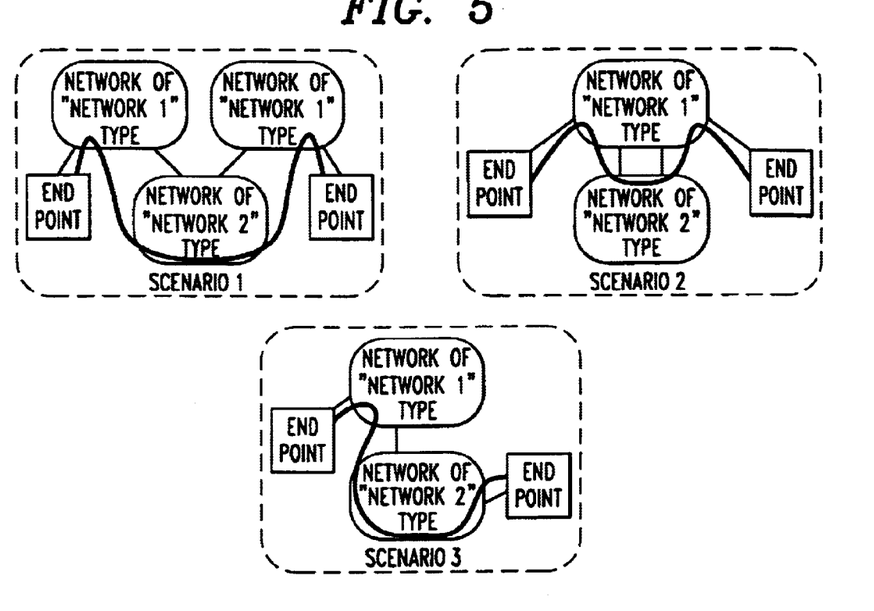
FIG. 5 is a functional block diagram illustrating three internetworking scenarios in which address resolution can be solved by the present invention.

Turning now to FIG. 5, the ensuing discussion of preferred embodiments of the invention contemplates three possible internetworking scenarios (Scenario 1, Scenario 2, and Scenario 3). In all three cases, gateways are used at the junctions between networks. In solving the address interworking problem, Scenario 1 and Scenario 2 are principally considered as they will be the most common. In these two scenarios, endpoints that need to communicate have network 1 type addresses, but calls/packets sent between the endpoints are routed through a network that uses a different addressing scheme, i.e., of network 2.

Summarizing in advance, the preferred solution for interworking addressing schemes will include the following steps identified as "1," "2," and "3," and an optional step "4":

1. Have gateways register network 1 addresses as encapsulated or algorithmically-mapped network 2 addresses with network 2 switches.
2. Network 2 switches use their routing protocols to disseminate reachability information about network-1-address encapsulated addresses.
3. When a call/packet arrives at an ingress gateway, it uses the automatic encapsulation/mapping mechanism to determine the network 2 address corresponding to the destination's network 1 address, and routes the call/packet with this address as the destination address. The network 2 switches/routers know how to route the call/packet since their routing databases have reachability information for such addresses. When the call/packet reaches the egress gateway, it reconstructs the network 1 address of the destination and continues routing the call/packet to the destination.
4. A part of the address can be allocated for higher-layer protocol information to allow for this information to be disseminated as part of address reachability propagation. This eliminates the need for terminal capability exchanges prior to connection setup.

Following are exemplary uses of this address interworking solution for PSTN/ATM internetworking, IP/ATM internetworking and PSTN/IP internetworking, respectively.

PSTN/ATM Address Interworking

A basic telephone call setup with no features is described in Section 1. Next, the issues of multiple media gateways and connection release are discussed in Sections 2 and 3, respectively. Finally, support for the two aspects of call control, terminal capability exchange and feature processing, is discussed in Sections 4 and 5.

1. Basic scheme

For PSTN/ATM address interworking, the proposed solution can be applied using implementation-specific versions of the four steps outlined above:

1. Use the E.164 -encapsulated AESA format permitted by the UNI (User Network Interface) signaling specification and register these encapsulated addresses using ILMI (Integrated Local Management Interface) or PNNI (Private Network-to-Network Interface) routing protocol.
2. Use PNNI routing or any other routing protocol to spread reachability information for E.164-encapsulated AESAs within the ATM network
3. When a PSTN call arrives at an ingress gateway, it determines the AESA equivalent of the called-party E.164 address and places this in the called-party address field of the ATM SETUP message. The call request is routed through the ATM network with resource reservation being performed along the way. The call will be routed to the egress gateway that registered the destination E.164 address. If more than one gateway registered an E.164 address, any of these will be reached. The egress gateway determines the called-party E.164 address from the called-party AESA and continues call setup to the destination.
4. The fourth step is not needed for basic call setup. Its use will be described in Section 4 below.

Figure 6:
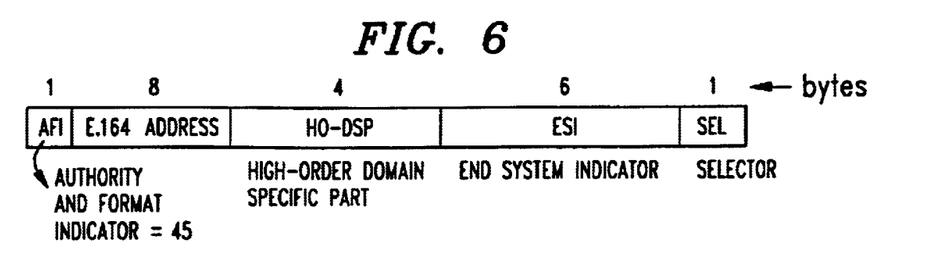
FIG. 6 is a diagrammatic illustration of the format of an E.164 -encapsulated AESA in accordance with the present invention.
Figure 7:
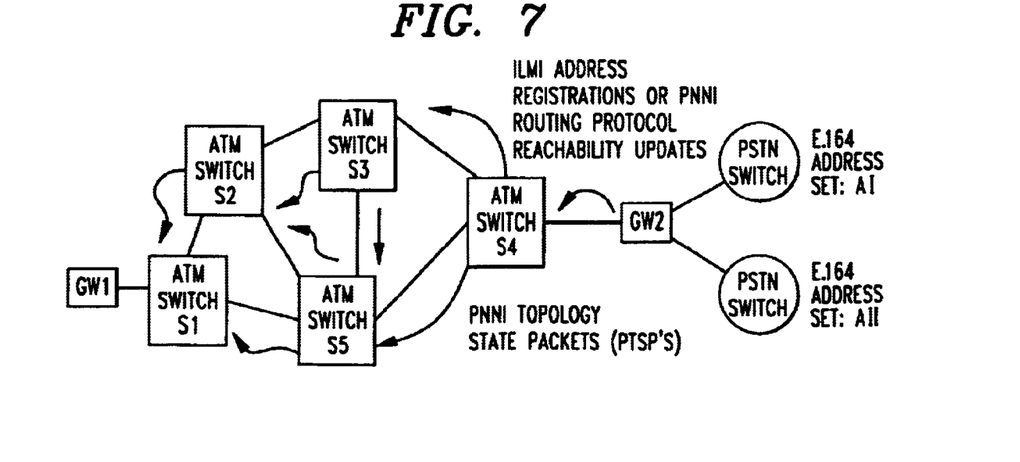
FIG. 7 is a functional block diagram showing a PSTN-ATM internetwork in which the address format of FIG. 6 can be used.

A format for E.164 -encapsulated AESAs is shown in FIG. 6. A network topology diagram is shown in FIG. 7. In step 1 above, ILMI or the PNNI routing protocol is used by a gateway (e.g., egress GW2) for AESA registration based on whether the interface from the gateway to the ATM switch (e.g., S4) is a UNI or an NNI (Network-Node Interface). As shown in FIG. 7, the egress GW2 registers E.164 -encapsulated AESAs with the ATM switch S4 for address sets AI and AII. Typically, ILMI client registrations are used by the network side of a UNI (i.e., an ATM switch) to write a network prefix into the ILMI MB (Management Information Base) at the client, and by the end host to write an ESI into the ILMI address registration MIB of the switch. However, ILMI also allows for "unassigned network prefixes." In other words, it allows an end host to register complete ATM addresses with network prefixes that were not assigned by the network side. This allows a GW to register E.164 addresses that it can reach on its PSTN side. In the network shown in FIG. 7, for example, GW2 can register the E.164 addresses of CPEs connected to PSTN switches 1 and 2 with its ATM switch S4. GW2 will create the AESA-equivalent of the E.164 address of the CPEs (among other addresses reachable through all telephone switches connected to GW2) and register these AESAs with its ATM switch S4. Summarized addresses can also be registered. For example, if a PSTN switch connected to GW2 can reach all 614–555 numbers, these are registered using one summarized AESA. If GW2 implements PNNI, then the PNNI routing protocol can be used between the GW and its neighboring ATM switch S4 to spread reachability information about E.164 addresses that can be reached on the TDM (Time Division Multiplexing) side of GW2. This programming of the gateway-ATM interface to receive calls destined for multiple AESAs (the gateway's own AESA plus the E.164-encapsulated AESAs it registers) is analogous to the multicast IP address-ethernet address interworking case described above where an ethernet card is programmed to receive MAC frames for its own unicast address as well as the IP-address-encapsulated MAC addresses for multicast groups.

In step 2 above, the ATM switches use the PNNI routing protocol to spread reachability information about E.164-encapsulated AESAs. An example is shown in FIG. 7, where ATM Switch S4 generates PTSPs (PNNI Topology State Packets), which are flooded to all other ATM switches within the peer group. Through this flooding method, ATM switch S1 now has reachability information for CPEs addressed by E.164 addresses in sets AI and AII. If the ATM switch S1-to-GW1 interface is PNNI, then S1 will further send the reachability information to GW1.

Step 3 above occurs when GW1 receives an IAM. Assuming that the called party number is set to an address within sets AI or AII, GW1 creates the corresponding AESA using the encapsulation mechanism shown in FIG. 6, and sends a UNI SETUP to ATM switch S1. This switch knows that the called party can be reached through switch S4 and it routes the connection to switch S4, which then directs the connection to GW2. Thus, the AESA of GW2 is not used in setting up the ATM connection (bearer); instead the AESA equivalent of the called E.164 address is used.

If multiple GWs connect to the same PSTN switches and register the same E.164 addresses with the same ATM switch using ILMI, this may or may not be acceptable to the specific ATM switch implementation. The ILMI specification does not explicitly allow or disallow this possibility. If this is disallowed in a specific implementation, the E.164-encapsulated AESAs can be registered as anycast addresses. Anycast addresses are used to support multiple servers offering the same service. One could regard the multiple GWs offering connectivity to a given E.164 address in this light. ILMI would allow for multiple registrations for an anycast address. Thus, each E.164-encapsulated ATM address is an anycast address. If PNNI is used on the interface between GWs and ATM switches, this issue with ILMI is avoided. Since a GW is a network node offering switching of data between ATM interfaces and TDM interfaces, its interface to an ATM switch could indeed execute PNNI protocols. The PNNI routing protocol allows multiple interfaces to carry PTSPs announcing reachability to the same endpoint.

Figure 8:
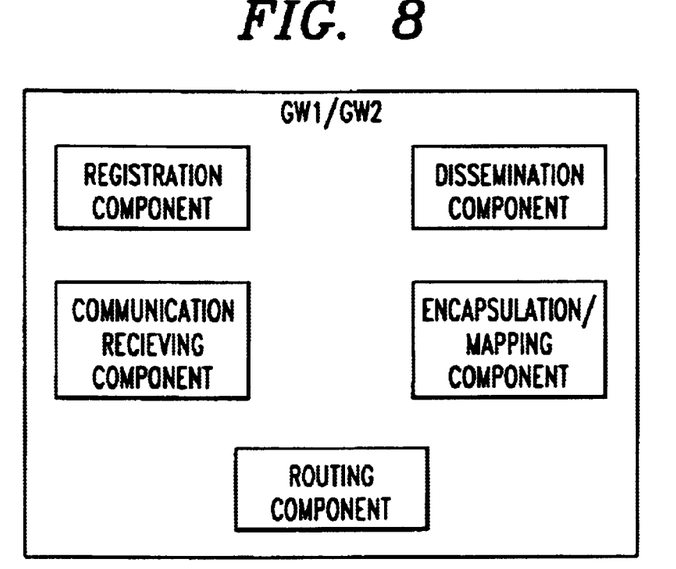
FIGS. 8 and 9 are functional block diagrams showing a gateway from FIG. 7.
Figure 9:
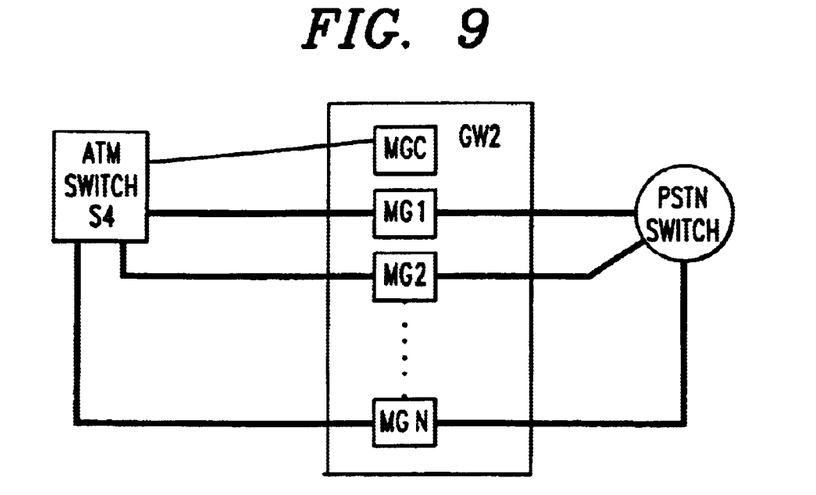

Exemplary internal software-implemented components of the gateways GW1 and GW2 are shown in FIG. 8. In accordance with step 1 above, a registration component is adapted to register one or more first network addresses in a second network as first network address-encapsulated or -mapped second network addresses that are accessible via the gateway. In accordance with step 2 above, a dissemination component is adapted to initiate the spread of reachability information through switching or routing nodes in the second network regarding the first network-encapsulated or -mapped second network addresses. In accordance with step 3 above, a communication receiving component is adapted to receive a communication request containing a first network destination address from the first network. Also in accordance with step 3 above, an encapsulation or mapping component is adapted to perform encapsulation or mapping of the first network destination address into a first network-encapsulated or -mapped second network destination address. Also in accordance with step 3 above, a routing component is adapted to route a communication request containing the first network-encapsulated or -mapped second network destination address through the second network based on the disseminated reachability information.

2. Multiple MGs

As shown in FIG. 1, a gateway is conventionally decomposed into a media gateway (MG) and a media gateway controller (MGC). In this section, attention is directed to a specific problem that arises if a GW has multiple media gateways. In general, GWs are expected to contain one MGC and multiple MGs, This is shown in FIG. 8, which is a more-detailed block diagram of GW2 from FIG. 7. The MGC keeps track of availability of trunks on the PSTN side for each of its MGs. When an egress GW receives an IAM call control query (see FIG. 1), the MGC can reply with the AESA of the MG that has available circuits to the egress PSTN switch. Without the call control query, a question arises as to how an MG with free circuits can be selected in accordance with proposed address interworking solution.

The answer depends on where ATM UNI signaling is located. If multiple instances of the UNI signaling protocol are implemented, one at each MG, then the solution is to use the "dynamic additions/deletions feature of ILMI." ILMI allows for a client to de-register addresses. If an MG finds that all its circuits are busy to the PSTN switch, it can issue a deregistration ILMI message to the ATM switch. This switch will then direct connection setup requests to other MGs. These deregistrations are not frequent. They are only needed if the circuit usage at an MG reaches a high loading level. Also, these deregistrations do not cause any PNNI PTSPs to be generated within the ATM network. The local ATM switch to which the GW is connected is the one that chooses the MG to use and hence no other ATM switch needs to be updated. The use of ILMI in this context is similar to using a routing protocol, such as PNNI routing, to report on changes in loading conditions. In fact, if the GW implements the PNNI routing protocol, PNNI PTSPs can be used to remove reachability for certain E.164 addresses from an MG at the local ATM switch. With the PNNI routing protocol, the gateway could also change the metric advertised as PSTN trunk capacity changes. Just as PTSPs are not generated for every change in loading conditions, but rather only for "significant changes," the same can be done with ILMI deregistrations or GW-to-ATM switch PNNI PTSPs.

If a single instance of UNI signaling is implemented for all the MGs at a GW, which could be located at the MGC, then there are two solutions to the multiple-MG problem: (a) ILMI de-registrations, and (b) non-associated signaling. The first solution is the same one described in the previous paragraph. The second solution uses non-associated signaling. With non-associated signaling, a VPCI/VCI (Virtual Path Connection Identifier/Virtual Channel Identifier) carries signaling messages for connections traversing other VPCs (Virtual Path Connections). A VPCI is shown to be associated with an interface and a VPI (Virtual Path Identifier) value. If the UNI SETUP message sent from the egress ATM switch to the egress GW carries a connection identifier parameter with a "no indication included" flag, then the MGC would select a VPCI/VCI. It does this by choosing an MG that has free TDM circuits to the PSTN switch. Thus, either option, ILMI/PNNI routing deregistrations or non-associated signaling, can be used to address the multiple-MG problem in accordance with the proposed address interworking solution.

3. Connection Release

To avoid having to set up an ATM connection for each voice call, it has been proposed to support delayed release of ATM connections. In other words, when a voice call is completed, only the PSTN section of the call is released while the ATM connection between the ingress and egress GWs is reused for other voice calls. The ATM connection is released only it is unused for a certain predetermined time period. Delayed release with a forward (pull) setup scheme of FIG. 1 works as follows. Each GW maintains a table such as the one shown in Table 1. After the call control query-response for a new voice call, Table 1 is consulted to determine a free ATM connection (identified by a VPI/VCI) corresponding to the AESA of the egress GW. For example, assume that in the network shown in FIG. 1:

TABLE 1

AESA to VPI/VCI mapping at GW1

| AESA | VPI/VCI |
|---|---|
| GW2 | 5/6 |

GW2 can reach telephones addressed by 212-549-XXXX and 212-980-XXXX. Further assume that an ATM connection was originally set up from GW1 to GW2 for a call incoming to 212-549-XXXX. When this voice call is released, the ATM connection is left unreleased. It can then be reused for a new call, such as one made to 212-980-XXXX. The call control query for the new call would return the AESA of GW2, and a lookup of Table 1 would return a VPI/VCI corresponding to this AESA.

In accordance with the proposed address interworking solution, column 1 of Table 1 would consist of AESAs corresponding to called E.164 addresses rather than AESAs of GWs. For the above example, there will be an entry corresponding to 212-549-XXXX and not for the AESA of GW2. This will prevent the ingress GW from recognizing the presence of a usable ATM connection for the second call (i.e., the one to 212-980-XXXX). This situation is shown by Table 2:

TABLE 2

AESA to VPI/VCI mapping at GW1

| AESA | VPI/VCI |
|---|---|
| 212-980-XXXX | 5/6 |

A solution to handle this situation is to pass on information about all E.164 addresses that are reachable through an egress GW to the ingress GW during/after ATM connection setup. As shown below in Table 3, a list of E.164-encapsulated AESAs would be associated with a given VPI/VCI. By using address summarization (since most E.164 addresses can be grouped by the first three or six digits), the number of entries in Table 1 can be kept low.

TABLE 3

AESA to VPI/VCI mapping at GW1

| AESA | VPI/VCI |
|---|---|
| 212-980, 212-549 . . . | 5/6 |

In the above example, when/after the first call was set up, GW1 would have received information about both 212-549 and 212-980, allowing it to associate all these AESAs with the new ATM connection. Thus, the second call can be routed on the same ATM connection. In effect, once an ATM connection is set up between gateways, they become logical neighbors in the ATM network. This allows them to exchange routing data, which includes their address reachability sets.

A method by which the egress GW2 of FIG. 6 can pass its E.164 reachability set to the ingress GW1 is via UNI user-to-user signaling combined with PNNI GFT (Generic Functional Transport) or GAT (Generic Application Transport) signaling between ATM switches. These hooks in UNI and PNNI signaling allow end nodes to send information transparently to each other.

If the ATM connection that is set up when the first call arrives is a switched virtual path connection, then a list of free VCIs can be maintained for this VPC at the ingress GW1. The ATM VPC is left connected unless a timer expires after the last call on the VPC exist. When a new call arrives, if the ATM VPC is still connected, a free VCI is chosen for use. VCI 5 on the VPC is allocated for signaling. This allows the ATM SETUP message to be sent on VCI 5 from ingress GW1 to egress GW2 without being processed at intermediate ATM switches. At the egress GW2, the called E.164 address is extracted from the SETUP message and call setup continued through the PSTN switches.

If the ATM connection that is set up for the voice channel when the first call arrives is a switched virtual channel connection, an associated signaling VCC (Virtual Channel Connection) can also be established between gateways. For subsequent calls, when a free VCC is selected for a new voice call, an ATM SETUP message is sent on the signaling VCC from gateway-to-gateway without any processing at intermediate switches communicating the selected VCCI (Virtual Channel Connection Identifier) in either the Generic Identifier Transport parameter or in the broadband low-layer information parameter. This explains the reason for creating an identifier to identify the whole VCC because VPI/VCIs have only local significance on each link of the connection. If AAL2 is used, channel identifier (CID) 8, which is reserved for signaling, could be used on the voice VCC instead of requiring a separate signaling VCC. In general, this could affect the performance of voice channels since intermediate ATM switches only route on VPI/VCIs and do not consult the CID field.

4. Terminal Capabilities

Terminal capabilities include the voice codecs implemented in gateways and AAL protocols used to carry voice. Many speech coding methods have been defined by various bodies. For example, ITU-T has defined G.711, G.722, G.723.1, G728, G729, etc., allowing for compressed voice to be sent at different data rates. Also, the ATM adaptation layer protocol used for voice can be AAL1, AAL2 or AAL5. The VTOA specification do not mandate a specific speech encoding scheme. Thus, it may be possible that the selected egress GW does not support the same speech encoding schemes supported by the ingress GW.

The availability of choices in voice coding and AAL protocol type creates a task of determining terminal capabilities before setting up connections. If an ATM connection is set up between two gateways that do not have the same capabilities, no communication is possible. If terminal capabilities are determined prior to connection setup, connections could be routed through converters to map between AAL protocol types or between different speech coding schemes to enable communication. Protocols such as H.245 and Session Description Protocol define methods to exchange terminal capabilities. Such protocols could be used in conjunction with the proposed address interworking solution for connection routing.

An alternative is proposed as step 4 outlined above. Information about higher layers can be propagated as part of the PNNI routing protocol by encapsulating this information into addresses. In other words, because there are many unused-bits in E.164 -encapsulated AESAs (see FIG. 6), these bits could be allocated to specify voice coding schemes and AAL protocol types supported at gateways through which specific E.164 destinations can be reached. This would allow the ingress GW1 in FIG. 7 to know whether the selected egress GW2 supports the same voice coding schemes and AAL protocol type as itself before initiating an ATM connection setup. Information regarding the AAL protocol and speech coding scheme supported by the two GWs can then be included in the B-LLI and B-HLI fields of the ATM SETUP/CONNECT messages for specific connections. Thus, in this scheme, while it is important to keep "call control" information separate from connection control information, nevertheless the former can be carried in both routing protocols and signaling protocols that are traditionally used for connection control.

The advantage of this approach over one that uses explicit call control signaling for features and terminal capability exchanges prior to connection setup is that extra delay overhead is avoided by reducing call/connection setup to one round-trip delay instead of two. On the other hand, the disadvantage incurred is in the increased routing protocol and signaling protocol message lengths and associated processing.

5. Features

A majority of telephone calls today invoke at least one feature, such as an 800-number translation or an LNP (Local Number Portability) translation, etc. Ingress-related features can be handled at the PSTN switch connected to the ingress GW1 or at the ingress GW2 (see FIG. 7). For example, an 800-number translation or an LNP (Local Number Portability) query can be handled in this manner. Egress-related features, such as call-forwarding-on-busy can be handled at the egress PSTN switch or egress GW2 after the ATM connection has been set up. The problem of a "busy" signal is handled in the same manner as in today's PSTN networks. In other words, if after setting up the ATM connection, the called telephone is found to be busy, then resources need to be released. Any gains in resource utilization by performing look-aheads for called party status need to be weighed against increased call setup delays incurred by round-trip feature checking.

For features such as Closed User Group (CUG) needed for virtual private networking, UNI user-to-user signaling and PNNI GAT or GFT can be used to pass ingress-side parameters, such as CUG code, to the egress side. Again, the same philosophy proposed for call control information can be used for features. This information should be clearly identified and kept separate from connection control information. However, for improved performance, call control parameters can be carried within connection control messages.

IP-ATM address interworking

In this section, the proposed address interworking solution is applied to the IP/ATM internetworking problem.

Figure 10:
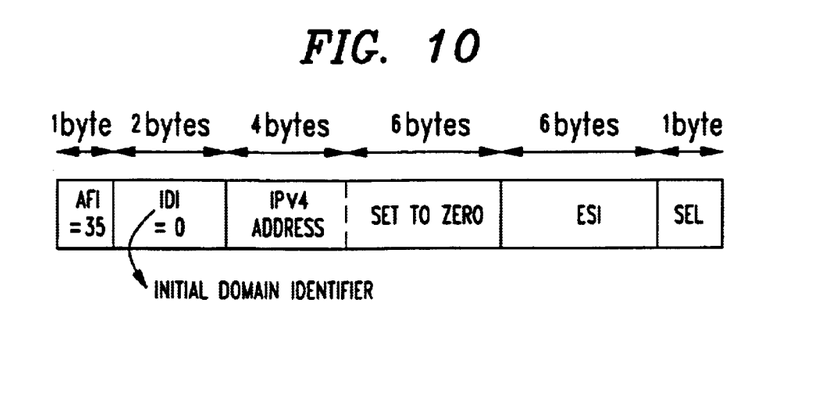
FIG. 10 is a diagrammatic illustration of an IP address-encapsulated AESA in accordance with the invention.
Figure 11:
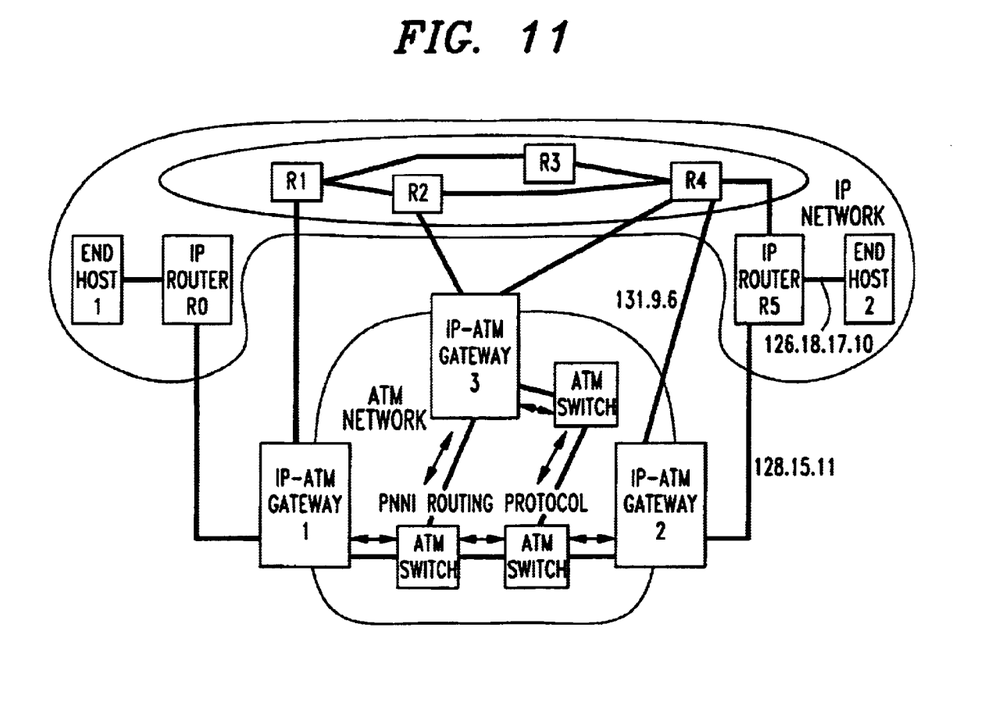
FIG. 11 is a functional block diagram showing an IP-ATM internetwork in which the address format of FIG. 10 can be used.

As is known, IPv4 addresses are 4 bytes long, while AESAs are 20 bytes long. This allows for an IP-address-encapsulated AESA format as shown in FIG. 10. This format is defined by ITU-T. Given this encapsulated format, the PNNI routing protocol can be used to spread reachability information, as shown in FIG. 11. IP-ATM Gateways 1 and 2, which are also IP routers, send reachability information about IP addresses in PNNI PTSPs (PNNI Topology State Packets) using the above-described IP address-encapsulated AESAs. When an IP packet arrives at IP-ATM Gateway 1 or 2, the gateway creates an ATM SETUP message using the IP-address-encapsulated AESA of the destination IP address as the called-party address field and initiates connection setup. The connection will be routed to an appropriate egress gateway (e.g., IP-ATM Gateway 2) given that all intermediate ATM switches have reachability information for this AESA. If the interfaces between IP-ATM Gateways 1 and 2 and their associated ATM switches are UNIs instead of PNNIs, then ILMI can be used for address registrations as in the PSTN/ATM address interworking scheme previously described.

In FIG. 11, the IP-ATM Gateway 2 reports reachability to IP subnets 128.15.11, 13 1.9.6 and 126.18.17 into the ATM network using the PNNI routing protocol. This information is spread to all the ATM switches and gateways. When IP-ATM Gateway 1 receives an IP datagram destined for 126.18.17.10, it encapsulates this address into an AESA of the type shown in FIG. 10, and initiates ATM connection setup. The connection will be routed to IP-ATM Gateway 2 because all ATM switches know that the AESAs corresponding to the IP subnet 126.18.17 are reachable through Gateway 2.

A point to note is that the gateways need to register all IP addresses for which they are programmed to serve as "gateway," not just the IP addresses in their routing data tables. For instance, consider the use of default routes in gateways. Routers typically have routing information for a few subnet addresses and a default route for all other addresses. For example, IP-ATM gateway 2 could have a routing table showing that 128.15.11 addresses are reachable through its 128.5.11 interface, 131.9.6 addresses are reachable through its 131.9.6 interface, and a third entry saying all default addresses are also reachable through its 131.9.6 interface. In this case, there is no explicit routing table entry for 126.18.17. However, if IP-ATM Gateway 2 needs to serve as a gateway for this 126.18.17 subnet, it needs to be programmed with this information so that the gateway can the register the AESA equivalent of this address into the ATM network. Thus, note that the address resolution information table at IPATM Gateway 2 is distinct from its own routing table information for IP addresses. This is true for any of the four solution categories used for address interworking.

PSTN-IP Address Interworking

Figure 12:
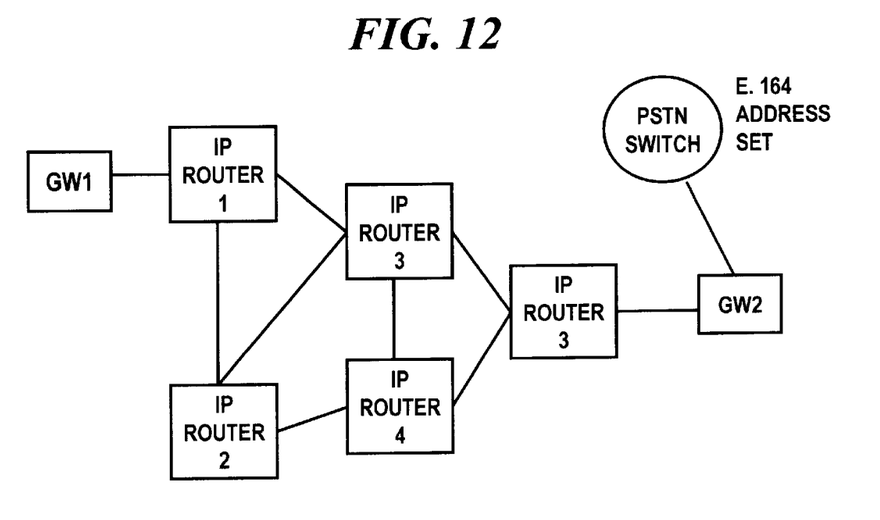
FIG. 12 is a functional block diagram showing a PSTN-IP internetwork.

In this section, the proposed address interworking solution is applied to the PSTN-IP address interworking problem. The overall scheme is to develop an automated address mapping scheme to determine IP addresses from E.164 addresses. As shown in FIG. 12, PSTN-IP Gateways 1 and 2 register these IP addresses with the IP network whose routing protocols spread reachability. When a PSTN call setup message arrives at the PSTN-IP Gateway 1 with a given destination E.164 address, this address is mapped into its corresponding IP address, and IP packets are generated by the gateway into the IP network. IP routers route the packets based on their destination IP address, which brings the packets to the egress gateway (PSTN-IP Gateway 2) that can then route the call toward the destination with the corresponding E.164 address.

While the principles of this interworking solution are the same, there are a few differences with the PSTN-ATM address interworking case. These include:

1. A complete address encapsulation of the E.164 address into an IP address is not possible as with AESAs. A full E.164 address (8 bytes) cannot be represented in just 4 bytes (IPv4 address size). Hence an address mapping scheme is needed, which is provided below.
2. As stated in Section 2, one of the costs of address encapsulation is that address space in the second network will be lost to encapsulated addresses and cannot be used for addressing within the second network for its own endpoints. This was not an issue with AESAs, since the AESA format is large (20 bytes). But this does become an issue with IPv4, whose address size is only 4 bytes. Registered IP addresses have become a scarce resource. Hence, while the proposed scheme will work with a conventional registered IP address space, it is preferable to use a private address space, such as the class A 10.x.x.x address group. The use of private addresses implies that NAT (Network Address Translation) or some such similar scheme is needed at routers that connect this private IP network to the global Internet. Scarce address space is much less of an issue with IPv6, which supports 16-byte addresses.
3. IP is connectionless as opposed to ATM, which is connection-oriented. This implies that a network topology change can easily cause packets destined to the same address to take different paths through the network. Consider the case where the destination address is the address of a service with multiple underlying physical destinations (i.e., an anycast address, such as would be used if more than one egress gateway is a valid candidate to reach the destination PSTN address). Stable calls will be disconnected when topology changes cause a different physical destination address to be used for a given encapsulated PSTN address.

E.164-to-IP Address Mapping

Assume that the private class A address space 10.x.x.x has been allocated to support the advertisement of PSTN addresses. The first six digits of E.164 addresses (not counting the country code) are adequate for routing in even very large networks (e.g. NPA-NXX routing in US networks). This greatly improves address summarization properties and therefore reduces the expected size of routing tables. The following discussion assumes these six digits, though the techniques discussed are certainly applicable to routing on any string of digits, which can be mapped if desired.

Figure 13:
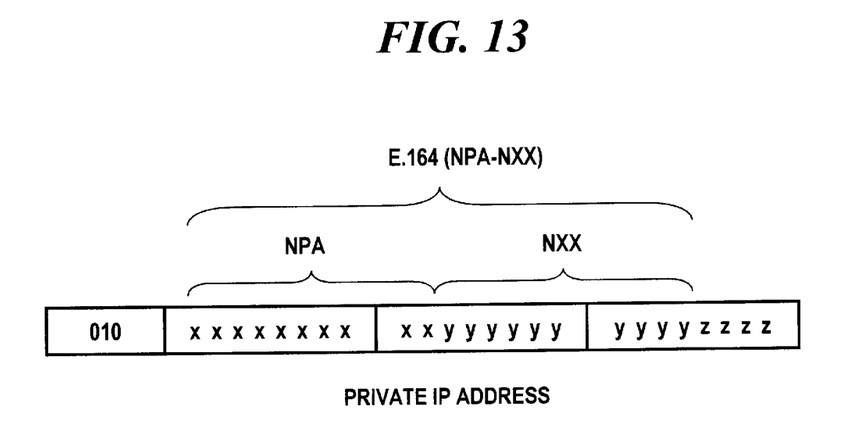
FIG. 13 is a diagrammatic illustration of an E.164 -mapped IP address in accordance with the invention for use in the PSTN-IP internetwork of FIG. 12.

As shown in FIG. 13, with 3 octets of discretionary IP address bits (given that the first byte is 10 indicating private IP addresses), the six E.164 digits can readily be represented as follows:

map the high order 3 digits to the first 10 bits (e.g., use a straight numeric mapping and add 1 to the result)

map the next 3 digits to the next 10 bits the remaining 4 bits can be used to advertise other properties if desired (e.g., support for speech codecs, call setup protocols such as H.323/SIP, etc.).

These mapped IP addresses are then advertised by conventional IP routing protocols, such as OSPF and RIPv2 (Routing Information Protocol Version 2) as follows:

have the media gateway controller (MGC) participate in the IP routing protocol(s) (a proxy could also be used)

let "map(E.164 address)" denote the IP address that is the result of mapping the E.164 address as described above; for each E.164 address group that a media gateway (MG) can reach, the MGC advertises a route to map(E.164 address).

The metric associated with this route can be varied if desired, based on such factors as administrative preference, remaining MG PSTN trunk capacity, etc. It is best to change the metric associated with a particular route only infrequently to reduce the load on the routers in the network.

As a result of this address advertising process, an ingress MGC can locate and send a packet to a suitable egress MGC for a given E.164 address simply by sending the packet to map(E.164 address). The network will deliver the packet to what it believes is the "closest" MGC (where the "closest" calculation is based on a combination of an egress MGC's advertised metric and the normal routing metric) that advertised reachability to that E.164 address.

Potential Issues Regarding The Sending Of Packets To IP Anycast Addresses

Because more than one MGC can have reachability to a particular E.164 address, the addresses being advertised are effectively anycast addresses. The following complications exist:

because IP can (albeit infrequently) duplicate datagrams, a single packet could be sent to more than one egress MGC sending 2 or more packets in sequence to a given anycast address can result in the packets going to different egress MGCs.

Typically this would occur as a result of a topology change in the router network making a different egress gateway now appear "closer," though it could also happen if an intervening router were configured to load-share on a per-packet basis along equal or roughly equal cost paths to a given destination.

Again, it is preferable that devices that find each other using anycast addresses learn the native unicast address of their peer on the first exchange of UDP datagrams, or during the first TCP connection and use the unicast address in future conversations.

Coping With IPv4 Address Scarcity

As mentioned above, it is preferable to use the private IP address space 10.x.x.x for advertising PSTN address reachability when using IPv4. Private IP addresses are never carried over the public internet. Devices that are connected to the IP network that uses the private address space often need connectivity to the public Internet/other private IP network. A solution to this issue is to use Network Address Translation (NAT).

In its most basic form, a NAT device (which is typically a router with enhanced functionality) acts as a gateway between the private network and another network, typically the public Internet. One or more addresses from the other network (Internet) are allocated for use by the NAT. Packets coming from the private network are rewritten by the NAT device to have a source address from the set of global addresses allocated (in fact, all occurrences of a private address anywhere in the packet should generally be replaced by corresponding allocated addresses from the other network). A binding is established between the private network address and port and the allocated address and port so that the NAT device can properly direct packets from the other network directed to a device in the private network. The prior art describes several variations on the basic approach (e.g. load-balancing, support for multiple NAT gateways, etc.), which might also be applicable depending on the set of scenarios under which devices using mapped E.164 addresses need to communicate with other devices.

Impact On Address Allocations In Two Networks Being Internetworked

Consideration must be given to the impact of using encapsulated addresses on the address allocation schemes allowed in two networks that are being internetworked. The primary impact is that if network 1 addresses are encapsulated to create network 2 addresses, then network 2 nodes cannot be allocated any such encapsulated addresses because reachability information for network 1 addresses are propagated through network 2 in encapsulated form. This would result in two nodes, a network 1 node and a network 2 node being addressed by the "same" address, which would lead to ambiguity in routing.

For example, it may be questioned whether an ATM switch be assigned an E.164 -encapsulated AESA if the E.164 address prefix is already allocated to a PSTN switch? The answer to this is no because if reachability about the PSTN E.164 address is spread through the ATM network and there is another distinct ATM switch with an equivalent AESA, then call routing to this address becomes ambiguous.

The implication is that some of network 2 addresses are sacrificed for use in encapsulated formats for other network addresses. This may be costly in some cases but not so in others. For example, IPv4 addresses are already at a premium. Setting aside blocks of IP addresses for encapsulated addresses would indeed pose a problem. The use of private IP addresses in conjunction with NAT is an engineering solution to this problem as described above. On the other hand, with 20-byte AESAs, the available address space is rather large. Using AFIs authority and format indicator to indicate the type of address, different encapsulated-address formats are possible. This impact was also described above where class-D-IP address-encapsulated ethernet addresses (addresses with the first three bytes equal to 0x01:00:5e) cannot be allocated as unicast ethernet addresses.

Comparison Of Address Interworking Solutions

In general, the first three prior art solution categories enjoy the advantage of not consuming address space of one network for encapsulated/mapped addresses, which, in turn, is the disadvantage of proposed solution herein. On the other hand, the first scheme ("pull") suffers from two problems: address resolution overhead, and requiring a method for servers/gateways that maintain address resolution information to be configured with each other's addresses. The second scheme ("push") suffers from creating more routing information (for example, PTSE storage in PNNI routing messages that carry transitive tags with information about E.164 or IP addresses), and needing more routing protocol processing because reachability for addresses that are not part of the base set of addresses supported by a network are now propagated. This is unlike the proposed solution in which address encapsulation is used. This implies that the reachability information spread in the proposed solution is part of the intrinsic set of addresses that are supported by the network. If encapsulated addresses are not used, this address space could potentially be allocated to native endpoints, which means reachability information will be created for those endpoints. If the "push" scheme is used with a separate routing protocol that runs only between gateways/servers that maintain address resolution information, then intermediate switches do not have the burden of processing or storing extra routing messages, but instead the problem of administering neighboring gateway information needs to be handled as in the "pull" schemes. The third scheme, of using administered data tables, has the problems of administering cross-gateway data at each gateway, a solution that does not scale well.

In the following subsections, the proposed address interworking solution is compared in more detail with other schemes relative to the three cases of PSTN/ATM, IP/ATM and PSTN/IP internet-works.

1. PSTN/ATM Address Interworking

Advantages of the proposed address interworking solution for PSTN/ATM internetworks include (1) no extra delay is incurred for address resolution during call setup, and (2) network administration of cross-gateway information regarding point code addresses of GWs corresponding to different E.164 addresses (described in Section ) is avoided.

A disadvantage of the proposed solution is that AESA address space is used for E.164-encapsulated addresses, which means that such addresses cannot be allocated within the ATM network. However, because AESAs are very large (20 bytes) and there are several other formats for use within the ATM network, this disadvantage is not a major one.

Other issues noted with the proposed address interworking solution have centered around the "extra" routing data and protocol messages needed within the ATM network to support E.164 addresses of external networks. The routing information/messages for E.164-encapsulated AESAs indeed cannot be considered as "extra," insofar as these AESAs are part of the overall 20-byte AESA space. The size of routing tables used in an ATM network that uses one of the other three address interworking schemes will be the same as in the proposed solution. Presumably if one of the other address interworking schemes are used, the E.164 -encapsulated AESAs can be allocated to ATM endpoints and switches, in which case routing information/messages will be needed to support these addresses. The cost of losing these addresses for allocation to ATM endpoints/switches has already been noted above.

Nevertheless, it is useful to quantify the size of routing tables needed to store reachability information for E.164 -encapsulated AESAs as well as the routing protocol messaging overhead. Even if reachability to all US-based E.164 addresses are propagated in the ATM network, this would result in requiring ATM switches to have another 6 MB of memory for the routing tables, as reasoned below. Because the first six digits of a ten-digit NANP number is sufficient for routing, a total of 1,000,000 numbers need to be stored. In binary notation, 20 bits are needed to represent 1M. Each of the 1M entries thus requires 1 byte for the AFI, 20 bits for the peer group ID (rounded up to 3 bytes), and 2 bytes for the next hop interface (this allows for a large number of neighbors with multiple interfaces per neighbor). Thus, a total of 6 MB of memory is sufficient for the "extra" reachability information. This estimate is pessimistic being based on the assumption that no address summarization is possible.

One can also quantify the "extra" routing protocol messages needed to spread reachability information about E.164 addresses. PNNI packet headers are 8 bytes. The database summary packet adds another 8 bytes in a header. For all PTSEs (PNNI Topology State Elements) from the same originating node, there is an overhead of 44 bytes. If the 1M numbers are distributed among 100 ATM switches and there is no address summarization, then each PTSE originating node reports on 10000 exterior ATM addresses. If all addresses reported by one ATM switch are put in one exterior reachable ATM address IG, and place this in one PTSE, then only one 16-byte overhead is incurred for the PTSE header. The exterior reachable ATM address IG (Information Group) is 16+8 bytes*10000=80016 bytes long. Therefore the total length of the database summary packet is (80016+16+44)*100+16=8007616 bytes, approximated to 8 MB. According to the PNNI routing specification, database summary packets are sent every DSRxmt Interval, whose default value is 5 seconds. Therefore the total traffic created is 12.8 Mbps. Thus, both the memory and bandwidth requirements to support E.164-encapsulated AESAs in PNNI routing are not very significant.

2. IP/ATM Address Interworking

The advantage of the proposed address interworking solution relative to NHRP is that call setup latency is lower in wide-area networks, which is the target for NHRP deployment. Also routers need to be enhanced with NHRP server capability, and a mechanism is needed to let NHRP servers determine their NHS neighbors.

When compared to the OSPF ARA scheme, it is noted that by using opaque LSAs, address summarization is not possible. Also, routing data/routing processing is clearly "extra" in the scheme relative to both our scheme and NHRP because even intermediate routers/switches that pass the ARAs transparently need to maintain the opaque LSAs or transitive tags.

The disadvantage of the proposed address interworking solution, regarding address space consumption, is overcome through the use of private addresses and NAT (or some such scheme).

3. PSTN/IP Address Interworking

The TRIP protocol uses the address resolution information "push" approach (solution category 2). It thus incurs the cost of extra routing to spread reachability of address resolution information for addresses not intrinsically used in the base network. Within a domain, if address resolution messages are used ("pull" technique), then there is an added delay.

Accordingly, an address interworking solution for an internetwork has been described. While various embodiments have been disclosed, it should be apparent that many variations and alternative embodiments could also be implemented. It is understood, therefore, that the invention is not to be in any way limited except in accordance with the appended claims.

What is claimed is:

1. In an internetwork that includes a first network communicating with a second network via one or more internetworking gateways, the first and second networks using different addressing schemes, a method for interworking between addresses of said first network (first network addresses) and addresses of said second network (second network addresses), comprising the steps of:

(a) registering one or more first network addresses in said second network as first network address-encapsulated or -mapped second network addresses wherein at least a portion of each first network address forms part of a corresponding second network address;

(b) disseminating reachability information through said second network regarding said first network-encapsulated or -mapped second network addresses;

(c) receiving in said second network a communication request containing a first network destination address, (d) performing encapsulation or mapping of said first network destination address into a first network-encapsulated or -mapped second network destination address; and (e) using said second network destination address including the portion thereof formed by said first network destination address, routing a communication request containing said second network destination address through said second network based on said disseminated reachability information.

2. A method in accordance with claim 1 wherein plural ones of said first network address-encapsulated or -mapped second network addresses are registered to a single one of said gateways.

3. A method in accordance with claim 1 wherein one of said first network address-encapsulated or -mapped second network addresses corresponds to a range (summary) of first network addresses.

4. A method in accordance with claim 1 wherein part of said first network address-encapsulated or -mapped second network addresses contain high level protocol information that is propagated as part of said disseminating step (b).

5. A method in accordance with claim 4 wherein said high level protocol information includes terminal capability information.

6. A method in accordance with claim 4 wherein said high level protocol information includes call feature information.

7. A method in accordance with claim 1 wherein said first network is a PSTN and said second network is an ATM network, and wherein:

(a) said registering step includes encapsulating E.164 PSTN addresses into E.164-encapsulated AESAs and registering them with an ATM switch;

(b) said disseminating step includes using a routing protocol to spread reachability information for said E.164-encapsulated AESAs through ATM switches in said ATM network;

(c) said receiving step includes receiving a PSTN call at one of said gateways from said PSTN;

(d) said encapsulation or mapping step includes encapsulating an E.164 call destination number for said PSTN call into an E.164-encapsulated destination AESA; and (e) said routing step includes routing a call setup request through said ATM network using said E.164-encapsulated AESA.

8. A method in accordance with claim 7 wherein encapsulation of E.164 PSTN addresses into E.164 AESAs includes encapsulating an 8-byte E.164 address adjacent to an AFI byte in said E.164 AESAs.

9. A method in accordance with claim 7 wherein one or more of said E.164-encapsulated AESAs are anycast addresses.

10. A method in accordance with claim 7 further including establishing a connection in said ATM network following said routing step (e), said connection being established on behalf of a call associated with said E.164 -encapsulated destination AESA, and wherein said method further includes delaying release of said connection following completion of said call so that a subsequent call may use said connection without said routing step being performed.

11. A method in accordance with claim 10 wherein said connection establishment step includes associating said connection with one or more E.164 -encapsulated AESAs that are reachable through said connection, and storing said association for reference during a period of connection release delay.

12. A method in accordance with claim 10 wherein said connection is a switched virtual path connection and said connection establishment step includes maintaining a list of free VCIs that are available for said subsequent call.

13. A method in accordance with claim 10 wherein said connection is a switched virtual channel connection and said connection establishment step includes establishing a voice channel VCC and a signaling channel VCC, said signalling channel VCC being usable to set up a voice channel for said subsequent call.

14. A method in accordance with claim 1 wherein said first network is an IP network and said second network is an ATM network, and wherein:
  (a) said registering step includes encapsulating IP addresses into IP-encapsulated AESAs and registering them with an ATM switch;
  (b) said disseminating step includes using a routing protocol to spread reachability information for said IP-encapsulated AESAs through ATM switches in said ATM network;
  (c) said receiving step includes receiving an IP network packet at one of said gateways from said IP network;
  (d) said encapsulation or mapping step includes encapsulating an IP packet destination address for said IP packet into an IP-encapsulated destination AESA; and
  (e) said routing step includes routing a connection setup request through said ATM network using said IP-encapsulated AESA.

15. A method in accordance with claim 14 wherein said registering step includes creating address, resolution tables at one of said gateways that are distinct from IP routing tables maintained by one of said gateways.

16. A method in accordance with claim 1 wherein said first network is a PSTN and said second network is an IP network, and wherein:
  (a) said registering step includes encapsulating E.164 PSTN addresses into E.164-encapsulated IP addresses and registering them with an IP router;
  (b) said disseminating step includes using a routing protocol to spread reachability information for said E.164 -encapsulated IP addresses through IP routers in said IP network;
  (c) said receiving step includes receiving a PSTN call at one of said gateways from said PSTN;
  (d) said encapsulation or mapping step includes encapsulating an E.164 call destination number for said PSTN call into an E.164 -encapsulated destination IP address; and
  (e) said routing step includes routing IP packets through said IP network using said E.164-encapsulated IP address.

17. A method in accordance with claim 16 wherein said E.164 -encapsulated IP addresses are formed by using four-octet long private IP addresses and mapping the first six digits of said E.164 addresses onto the last three octets of said private IP addresses.

18. A method in accordance with claim 17 wherein said mapping includes mapping the high order three digits of said E.164 addresses onto the first ten bits of the last three octets of said private IP addresses, mapping the next three digits of said E.164 addresses onto the second ten bits of the last three octets of said private IP addresses, and using the remaining four bits of the last three octets of said private IP addresses for carrying high level protocol information.

19. In an internetwork that includes a first network communicating with a second network via one or more internetworking gateways, the first and second networks using different addressing schemes, a system for interworking between addresses of said first network (first network addresses) and addresses of said second network (second network addresses), comprising:
  said one or more gateways being adapted to register one or more first network addresses in said second network as first network address-encapsulated or- mapped second network addresses that are accessible via said one or more gateways, wherein at least a portion of each first network address forms part of a corresponding second network address;
  said second network being adapted to disseminate reachability information regarding said first network-encapsulated or -mapped second network addresses;
  one of said gateways being adapted to act as a receiving gateway that receives in said second network a communication request containing a first network destination address;
  said receiving gateway being adapted to perform encapsulation or mapping of said first network destination address into a first network-encapsulated or -mapped second network destination address; and
  said receiving gateway and said switching or routing nodes being adapted to route using said second network destination address, including the portion thereof formed by said first network destination address, a communication request containing said second network destination address through said second network based on said disseminated reachability information.

20. A system in accordance with claim 19 wherein plural ones of said first network address-encapsulated or -mapped second network addresses are registered to a single one of said gateways.

21. A system in accordance with claim 19 wherein one of said first network address-encapsulated or -mapped second network addresses corresponds to a range (summary) of first network addresses.

22. A system in accordance with claim 19 wherein part of said first network address-encapsulated or -mapped second network addresses contain high level protocol information that is propagated as part of said disseminating step (b).

23. A system in accordance with claim 22 wherein said high level protocol information includes terminal capability information.

24. A system in accordance with claim 22 wherein said high level protocol information includes call feature information.

25. A system in accordance with claim 19 wherein said first network is a PSTN and said second network is an ATM network comprising plural switching nodes, and wherein:
  said one more gateways are adapted to encapsulate E.164 PSTN addresses into E.164-encapsulated AESAs and register them with an ATM switch;
  said ATM network is adapted to use a routing protocol to spread reachability information for said E.164

-encapsulated AESAs through ATM switches in said ATM network;

said receiving gateway is adapted to receive a PSTN call from said PSTN;

said receiving gateway is adapted to encapsulate an E.164 call destination number for said PSTN call into an E.164 -encapsulated destination AESA; and said receiving gateway and said switching nodes are adapted to route a call setup request through said ATM network using said E.164-encapsulated AESA.

26. A system in accordance with claim 25 wherein encapsulation of E.164 PSTN addresses into E.164 AESAs includes encapsulating an 8-byte E.164 address adjacent to an AFI byte in said E.164 AESA.

27. A system in accordance with claim 25 wherein one or more of said E.164-encapsulated AESAs are anycast addresses.

28. A system in accordance with claim 25 wherein said receiving gateway is further adapted to establish a connection in said ATM network following routing of said call setup request, said connection being established on behalf of a call associated with said E.164-encapsulated destination AESA, and wherein said receiving gateway is further adapted to delay release of said connection following completion of said call so that a subsequent call may use said connection without said routing being performed.

29. A system in accordance with claim 28 wherein said receiving gateway is adapted to associate said connection with one or more E.164 -encapsulated AESAs that are reachable through said connection, and to store said association for reference during a period of connection release delay.

30. A system in accordance with claim 28 wherein said connection is a switched virtual path connection and said receiving gateway is adapted to maintain a list of free VCIs that are available for said subsequent call.

31. A system in accordance with claim 28 wherein said connection is a switched virtual channel connection and said receiving gateway is adapted to establish a voice channel VCC and a signaling channel VCC, said signalling channel VCC being usable to set up a voice channel for said subsequent call.

32. A system in accordance with claim 19 wherein said first network is an IP network and said second network is an ATM network comprising plural switching nodes, and wherein:

said one or more gateways are adapted to encapsulate IP addresses into IP-encapsulated AESAs and register them with an ATM switch;

said ATM network is adapted to use a routing protocol to spread reachability information for said IP-encapsulated AESAs through ATM switches in said ATM network;

said receiving gateway is adapted to receive an IP network packet from said IP network;

said receiving gateway is adapted to encapsulate an IP packet destination address of said IP packet into an IP-encapsulated destination AESA; and said receiving gateway and said switching nodes are adapted to route a connection setup request through said ATM network using said IP-encapsulated AESA.

33. A system in accordance with claim 32 wherein said one or more gateways are adapted to create address resolution tables at said gateways that are distinct from IP routing tables maintained by said gateways.

34. A system in accordance with claim 19 wherein said first network is a PSTN and said second network is an IP network comprising plural routing nodes, and wherein:

said one or more gateways are adapted to encapsulate E.164 PSTN addresses into E.164-encapsulated IP addresses and register them with an IP router;

said IP network is adapted to use a routing protocol to spread reachability information for said E.164 -encapsulated IP addresses through routers in said IP network;

said receiving gateway is adapted to receive a PSTN call from said PSTN;

said receiving gateway is adapted to encapsulate an E.164 call destination number for said PSTN call into an E.164 -encapsulated destination IP address; and said receiving gateway and said routing nodes are adapted to route IP packets through said IP network using said E.164 -encapsulated IP address.

35. A system in accordance with claim 34 wherein said one or more gateways are adapted to form said E.164 -encapsulated IP addresses using four-octet long private IP addresses and mapping the first six digits of said E.164 addresses onto the last three octets of said private IP addresses.

36. A system in accordance with claim 35 wherein said one or more gateways are adapted to map the high order three digits of said E.164 addresses onto the first ten bits of the last three octets of said private IP addresses, map the next three digits of said E.164 addresses onto the second ten bits of the last three octets of said private IP addresses, and use the remaining four bits of the last three octets of said private IP addresses for carrying high level protocol information.

37. A inter-networking gateway for connecting a first network with a second network, the first network using first network addresses and the second network using second network addresses, comprising:

a registration component adapted to register one or more first network addresses in said second network as first network address-encapsulated or- mapped second network addresses that are accessible via said gateway and wherein at least a portion of each first network address forms part of a corresponding second network address;

a dissemination component adapted to initiate the spread of reachability information through switching or routing nodes in said second network regarding said first network-encapsulated or mapped second network addresses;

a communication receiving component adapted to receive in said second network a communication request containing a first network destination address from said first network, an encapsulation or mapping component adapted to perform encapsulation or mapping of said first network destination address into a first network-encapsulated or -mapped second network destination address; and a routing component adapted to route using said second network destination address, including the portion thereof formed by said first network destination address, a communication request containing said second network destination address through said second network based on said disseminated reachability information.

* * * * *